United States Patent
Behrendt (10) Patent No.: US 10,670,567 B2
(45) Date of Patent: Jun. 2, 2020

(54) COMMUNICATION WITH TESTING SYSTEMS

(71) Applicant: General Electric Company, Schenectady, NY (US)

(72) Inventor: Torsten Behrendt, Huerth (DE)

(73) Assignee: General Electric Company, Schenectady, NY (US)

( * ) Notice: Subject to any disclaimer, the term of this patent is extended or adjusted under 35 U.S.C. 154(b) by 230 days.

(21) Appl. No.: 15/484,848

(22) Filed: Apr. 11, 2017

(65) Prior Publication Data
US 2018/0292359 A1 Oct. 11, 2018

(51) Int. Cl.
*G01N 29/24* (2006.01)

(52) U.S. Cl.
CPC .................. *G01N 29/2481* (2013.01)

(58) Field of Classification Search
CPC .................................. G01N 29/2481
See application file for complete search history.

(56) References Cited

U.S. PATENT DOCUMENTS

| 8,874,383 | B2 | 10/2014 | Gambier et al. | |
|---|---|---|---|---|
| 2008/0116908 | A1* | 5/2008 | Potyrailo | G21C 17/022 324/721 |
| 2009/0189738 | A1 | 7/2009 | Hermle | |
| 2014/0107487 | A1 | 4/2014 | Kim et al. | |
| 2014/0303755 | A1 | 10/2014 | Landgraf et al. | |
| 2015/0377214 | A1 | 12/2015 | Du Plessis | |
| 2016/0220325 | A1 | 8/2016 | Jeon et al. | |
| 2016/0379426 | A1* | 12/2016 | Tholen | G07C 9/00015 340/5.21 |
| 2017/0105703 | A1* | 4/2017 | Han | A61B 8/565 |

FOREIGN PATENT DOCUMENTS

| WO | 2011/132122 A1 | 10/2011 |
|---|---|---|
| WO | 2016070019 A2 | 5/2016 |

OTHER PUBLICATIONS

International Search Report and Written Opinion issued in connection with corresponding PCT Application No. PCT/US2018/026452 dated Jul. 26, 2018.
Hepeng, Dai, and Su Donglin, "Indoor location system using RFID and ultrasonic sensors". In 2008 8th International Symposium on Antennas, Propagation and EM Theory, Nov. 2-5, 2008.

* cited by examiner

Primary Examiner — David Z Huang
(74) Attorney, Agent, or Firm — Mintz Levin Cohn Ferris Glovsky and Popeo, P.C.

(57) ABSTRACT

A testing system and methods for using the same are provided. The testing system can include a sensor and a radiofrequency (RF) tag mounted on the sensor. The RF tag can be configured to store sensor information regarding the sensor and to wirelessly communicate at least a portion of the sensor information to a portable computing device upon request. The portable computing device can be configured to allow an operator to obtain selected sensor information from the RF tag and display it on the portable computing device. The portable computing device can also be configured to retrieve additional sensor information from external sources, such as a sensor manufacturer, via a network. Thus, sensor information can be retrieved in the field by the portable computing device for use in operating the testing system.

12 Claims, 4 Drawing Sheets

COMMUNICATION WITH TESTING SYSTEMS

BACKGROUND

Ultrasound probes are testing systems that can be used for non-destructive testing of mechanical structures such as tubes, plates, and bars. In general, ultrasound probes operate by generating acoustic signals and detecting acoustic signals reflected from the test structure. Analysis of the reflected acoustic signals can yield information about the test structure, such as the presence of flaws and dimensions.

To ensure proper operation of a given ultrasound probe, probe specific information issued by a manufacturer can be referenced by an operator during use. However, this information can be lost or separated from its corresponding ultrasonic probe, potentially incurring delays during its retrieval from a manufacturer.

SUMMARY

In general, systems and methods are provided for communication with testing systems, such as ultrasound probes.

In one embodiment, a testing system is provided and can include a sensor and a radiofrequency (RF) tag mounted on the sensor. The RF tag can be configured to store sensor information and to wirelessly transmit at least a portion of the sensor information in response to receipt of a request for sensor information.

The RF tag can have a variety of configurations. In one embodiment, the RF tag can be configured to receive sensor information from the sensor for storage. Sensor information received from the sensor can include an operating time of the sensor. In another embodiment, the RF tag can be configured to receive sensor information for storage from a data source external to the testing system. Sensor information received from a data source external to the testing system can include, for example, a unique identifier of the sensor, a sensor certificate, a sensor datasheet, a calibration due date for the sensor, and/or test orders for the sensor.

In another embodiment, the transmitted sensor information can be a link to a network resource storing at least one of a unique identifier of the sensor, a sensor certificate, a sensor datasheet, a calibration due date for the sensor, test orders for the sensor, and/or an operating time of the sensor.

In other aspects, an ultrasound testing system is provided and can include an ultrasound probe and a radiofrequency (RF) tag. The RF tag can be configured to store probe information regarding the ultrasound probe and to wirelessly transmit at least a portion of the probe information in response to receipt of a near-field communication from an authorized source.

The RF tag can have a variety of configurations. In one embodiment, the RF tag can be configured for passive operation. In another embodiment, the RF tag can be mounted to a housing of the ultrasound probe. In another embodiment, the RF tag can be configured for read-only storage of at least a portion of the probe information.

In another embodiment, the RF tag can be configured to receive probe information from the ultrasonic probe for storage. The probe information received from the ultrasonic probe can include, for example, an operating time of the ultrasound probe.

In another embodiment, the authorized near-field communication can be received from a portable computing device. The probe information can include at least one of a unique identifier of the ultrasound probe, an ultrasound probe certificate, an ultrasound probe datasheet, a calibration due date for the ultrasound probe, and/or test orders for the ultrasound probe.

Methods for communicating with an ultrasound testing system are also provided. In one embodiment, a method can include causing a portable computing device to transmit a first near-field communication to a radiofrequency (RF) tag that can store probe information regarding an ultrasound probe, where the first near-field communication can request at least a portion of probe information stored by the RF tag and where the portable computing device receives a second near-field communication that can include at least a portion of the requested probe information.

In another embodiment, the probe information can include at least one of a unique identifier of the sensor, a sensor certificate, a sensor datasheet, a calibration due date for the sensor, test orders for the sensor, and/or an operating time of the sensor.

In another embodiment, the probe information can include an operating time of the ultrasound probe.

In another embodiment, the requested probe information can include a link to a network resource storing at least one of a unique identifier of the sensor, an ultrasound probe certificate, an ultrasound probe datasheet, a calibration due date for the ultrasound probe, test orders for the ultrasound probe, and/or an operating time of the ultrasound probe.

In other aspects, the method can include causing the portable computing device to transmit a third communication to the network resource requesting the probe information corresponding to the link. The portable computing device can receive a fourth communication that includes the probe information corresponding to the link.

In another embodiment, the RF tag can be mounted to the ultrasonic probe.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Manufacturers of testing systems, such as ultrasound probes, can provide customers with a variety of information for use during operation and maintenance of their testing system. This information can detail capabilities of the testing system and maintenance schedules, among others, and can be specific to a given testing system. However, this information is commonly issued in paper form and can be easily lost after purchase of the sensor. In some instances, when information for a testing system is lost, use of the testing system can be delayed while an owner or operator of the testing system identifies the specific testing system and contacts the manufacturer to obtain duplicate copies of the information. Accordingly, a testing system is provided that enables sensor information to be electronically stored and wirelessly communicated to a user upon request. Other embodiments are within the scope of the disclosed subject matter.

Embodiments of testing systems are discussed herein with reference to ultrasonic probes. However, embodiments of the disclosure can be employed with any testing system without limit, such as X-ray, computed tomography (CT), magnetic resonance imaging (MRI), eddy current, and nuclear inspection systems.

Figure 1:
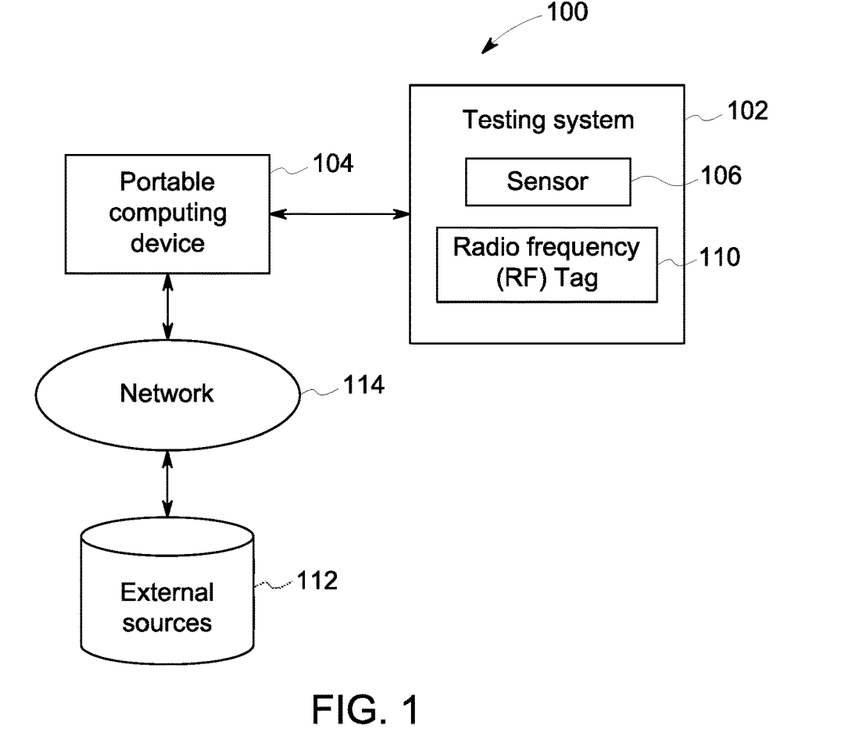
FIG. 1 is a diagram illustrating one exemplary embodiment of an operating environment including a testing system having a sensor and a radiofrequency (RF) tag in communication with a portable computing device.

FIG. 1 illustrates one exemplary embodiment of an operating environment 100 that includes a testing system 102 configured to communicate with a portable computing device 104. As discussed in detail below, the testing system 102 can include a sensor 106 and a radiofrequency (RF) tag 110. The RF tag 110 can be configured to store sensor information regarding the sensor 106 and to wirelessly communicate at least a portion of the sensor information to the portable computing device 104 upon request. The portable computing device 104 can be configured to allow an operator to obtain selected sensor information from the RF tag 110 and display it on the portable computing device 104. The portable computing device 104 can also be configured to retrieve additional sensor information from external sources 112, such as a sensor manufacturer, via a network 114. Thus, sensor information can be retrieved in the field by the portable computing device 104 for use in operating the testing system 102.

Figure 2:
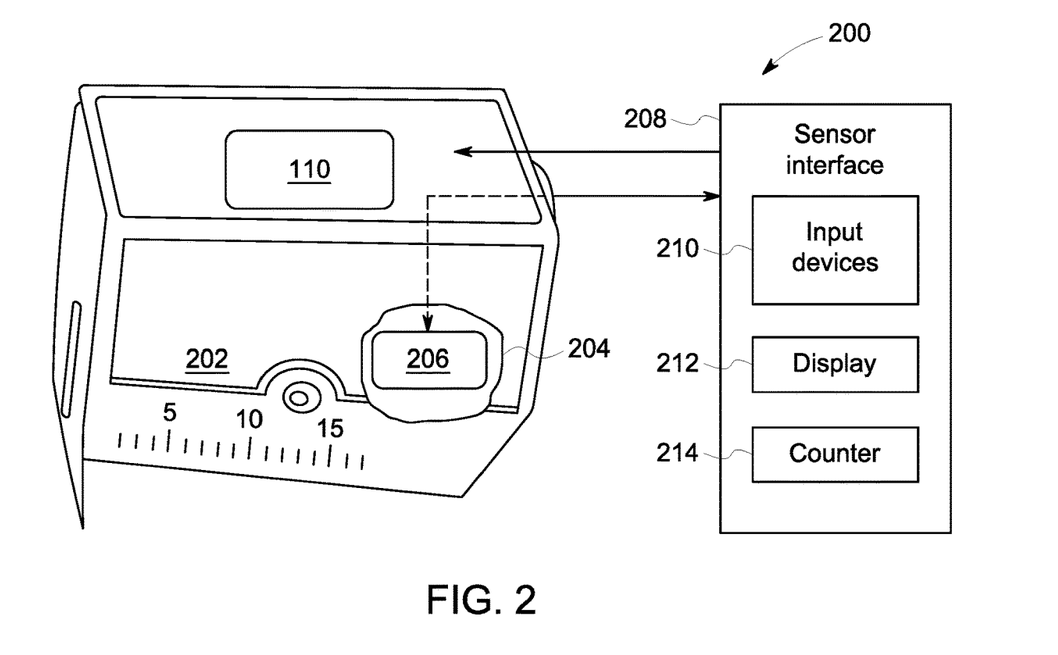
FIG. 2 is a perspective view of the testing system of FIG. 1 showing a diagram of the sensor and a sensor interface.

FIG. 2 illustrates one exemplary embodiment of a testing system in the form of a sensor 200 that can be used in the operating environment 100 of FIG. 1. As shown, the sensor 200 includes a housing 202 defining a cavity 204 having one or more sensing elements 206 disposed therein, and a sensor interface 208 mounted within or disposed on the housing 202. The sensor 200 also includes the RF tag 110 disposed thereon for communicating with the portable computing device 104. As shown in FIG. 2, the RF tag 110 can be secured to an outer surface of the housing 202. However, alternative embodiments of the testing system (not shown) can position the RF tag at other locations for enabling sensor information to be stored and communicated to an operator. In one aspect, at least a portion of the RF tag can be positioned within the sensor cavity. In another aspect, the RF tag can be mounted on various devices (e.g., other than the housing) located proximate to or distanced from the sensor.

The housing 202 can have any shape and can be formed from any material suitable for housing the sensing element(s) 206. The sensor 200 can be an ultrasonic sensor and the sensing element(s) 206 can be one or more of ultrasonic transmitters, ultrasonic receivers, ultrasonic transducers, and combinations thereof.

The sensor interface 208, schematically shown in FIG. 2, can be operatively coupled to the sensing element(s) 204 and can include one or more input devices 210, a display 212, and a counter 214. The input devices 210 can be actuatable objects (e.g., knobs, buttons, switches, etc.) that allow an operator of the sensor 200 to activate and/or adjust various operating parameters for the sensing elements 206, the display 212, and/or the counter 214 during use. The display 212 can receive and display, in real-time, sensor measurements (e.g., acoustic signals) acquired by the sensing element(s) 206 from a test structure. The counter 214 can measure use of the sensor 200 (e.g., hours of operation).

The sensor 200 can also include one or more memory devices (not shown) for storing measurements acquired by the sensor 200 (e.g., by the sensing elements 206 and/or the counter 214). As discussed in greater detail below, the sensor interface 208 can also be configured to communicate with the RF tag 110 for storing sensor information.

Figure 3:
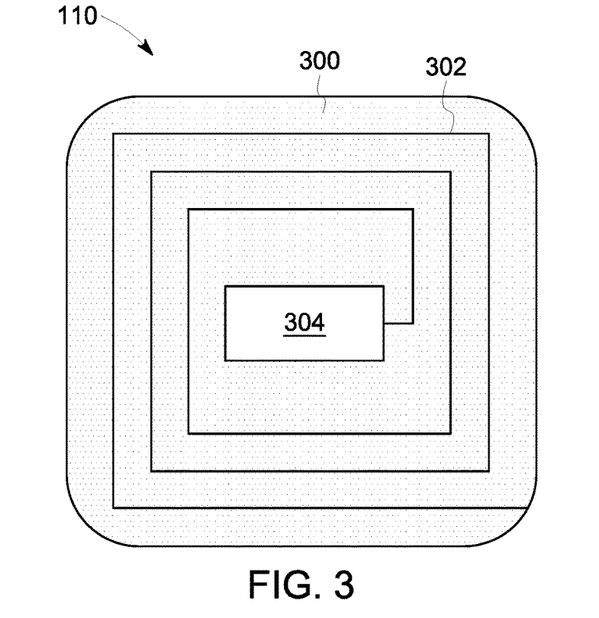
FIG. 3 is a top view of one exemplary embodiment of an RF tag for use with the testing system of FIG. 1.

FIG. 3 is a top down view of one exemplary embodiment of the RF tag 110 in greater detail, including a substrate 300, an antenna 302, and a microchip 304. As shown, the substrate 300 can be formed as a generally planar shape that receives the antenna 302 and the microchip 304 on one surface. An opposing surface of the substrate 300 can include an attachment mechanism (e.g., an adhesive, a portion of a hook and loop fastener, etc.) capable of securing the RF tag 110 to a surface of the housing 202. The substrate 300 can be formed from a material capable of withstanding selected service conditions (e.g., temperature, stress, chemical compatibility, etc.). Examples of substrate materials can include, but are not limited to, polymers and papers.

The antenna 302 can include loops or coils of conductive metal wire in electrical communication with the microchip 304, and it can be configured for receipt and transmission RF waves. As an example, the antenna 302 can be configured to receive and transmit RF waves having frequencies ranging between about 300 MHz to about 300 GHz. In certain embodiments, the antenna 302 can be configured to receive and transmit RF waves at frequencies less than about 1 GHz, which can allow penetration through most objects to facilitate communication with devices lacking line of sight with the RF tag 110. These frequency ranges are merely exemplary, and other frequencies can be used e.g., about 1 Hz to about 1 THz.

The microchip 304 can be an integrated circuit including a processor and a non-volatile memory (not shown) configured to store sensor information. The microchip memory can be a read only memory device, a read-write memory device, and combinations thereof. RF waves received by the antenna 302 can contain commands for storage of sensor information by the microchip memory or transmission of sensor information stored by the microchip memory. Accordingly, the microchip processor can also be configured to process these commands.

In certain embodiments, the microchip 304 can be configured to only process commands received from an authorized source. As an example, the microchip 304 can employ one or more authentication protocols to verify whether a given communication received by the RF tag 110 is from an authorized source.

Embodiments of the RF tag 110 can be configured to operate passively. In this configuration, the RF tag 110 can transmit sensor information only in response to requests from authorized sources. As an example, electrical currents can be induced within the antenna 302 upon receipt of RF waves. At least a portion of this current can be employed to power operation of the microchip 304 and transmission of RF waves by the antenna 302. Accordingly, embodiments of the RF tag 110 can omit an internal power source. However, alternative embodiments of the RF tag can be configured to operate actively and transmit sensor information or other information absent requests from authorized sources. Embodiments of the RF tag configured for active operation can also include a power source (not shown) electrically coupled to the microchip and the antenna, such as a battery.

Embodiments of the RF tag 110 can also transmit RF waves according to any of a variety of wireless communication protocols. Examples of wireless communication protocols can include, but are not limited to, radiofrequency identification (RFID), near field communication (NFC), Wi-Fi®, and Bluetooth®.

Figure 4:
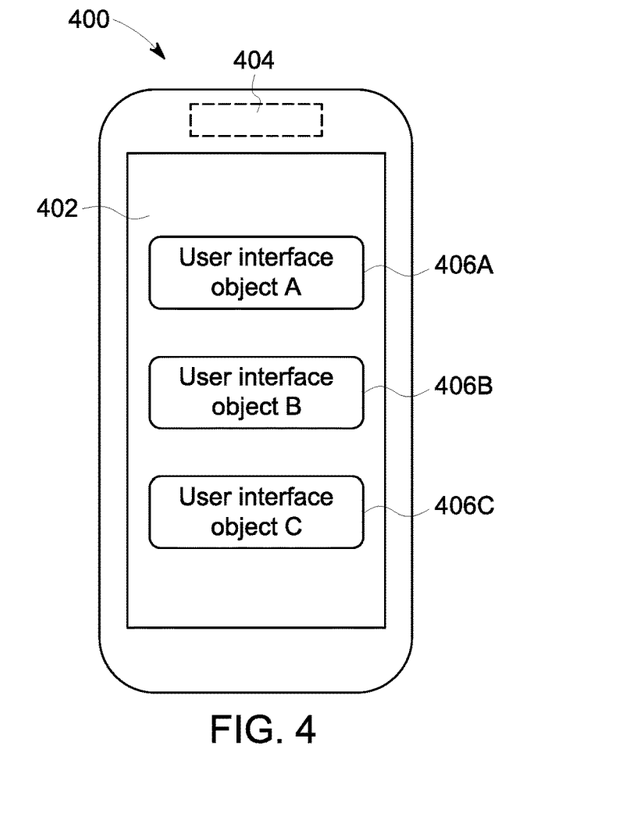
FIG. 4 is a front view of one exemplary embodiment of a portable computing device for use with the operating environment of FIG. 1.

FIG. 4 is a front view illustrating an exemplary embodiment of a portable computing device in the form of a smartphone device 400 for use with the testing system 102 of FIG. 1. The device 400 can include a processor (not shown), a display 402, and a transceiver 404. The processor can execute applications providing one or more selectable user interface objects 406 (e.g., 406A, 406B, 406C) for presentation by the display 402. The transceiver 404 can be configured for communication with the RF tag 110 and other communication networks (e.g., the network 114) according to any communication protocols supported by the RF tag 110 and the network 114. As discussed in greater detail below, in certain embodiments, an operator can select any of the user interface objects 406 to command the RF tag 110 to transmit sensor information corresponding to the selected user interface objects 406 to the device 400. An operator can also select any of the user interface objects 406 to command the RF tag 110 to receive and update sensor information provided by the device 400. Sensor information received from the RF tag 110 can be further displayed to an operator on the display 402 and/or stored for later viewing on the display 402. While the illustrated device 400 is a smartphone, embodiments of the portable computing device can also include tablet computers, laptops, personal digital assistants (PDAs), wearable computing devices (e.g., watches), and the like.

Figure 5:
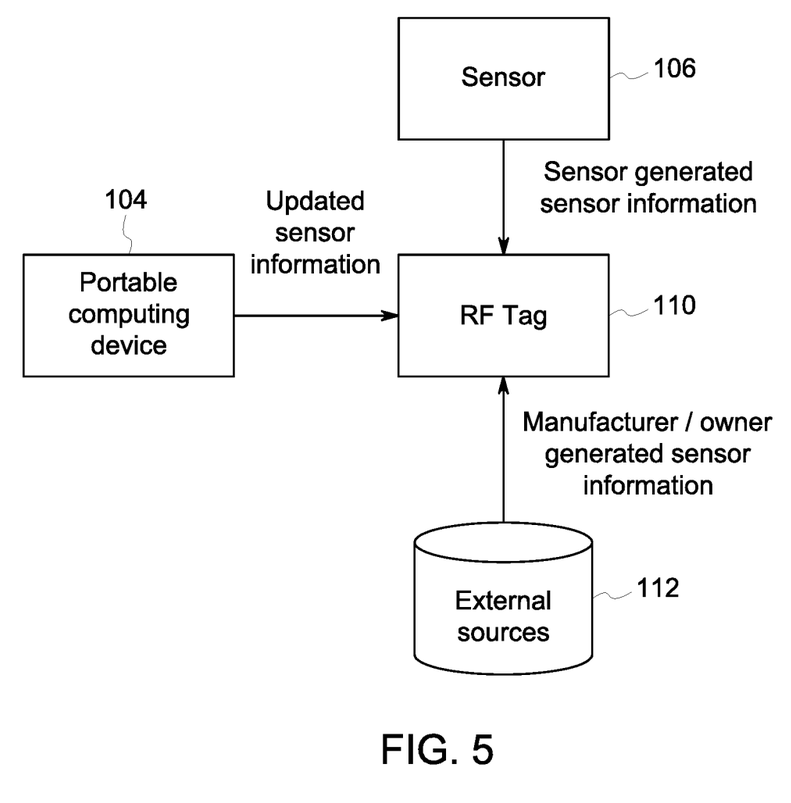
FIG. 5 is a diagram illustrating one exemplary embodiment of external sources for storing sensor information and for communicating with the RF tag of FIG. 1.

FIG. 5 is a diagram illustrating embodiments of sources for storing sensor information and communicating with the RF tag 110. As shown, sensor information can be transmitted to the RF tag 110 from a variety of authorized sources for storage, such as the portable computing device 104, the sensor 106, and external sources 112. In one embodiment, the external sources 112 can include, but are not limited to, any computing devices external to the testing system 102 (e.g., RF readers). These external sources 112 can be operated under the authority of a sensor manufacturer, a sensor owner, a sensor operator, and/or designates thereof (e.g., repair centers). External sources 112 can also include network resources accessible via the network 114, such as websites and databases, that maintain sensor information.

Examples of sensor information can include one or more of the following, in any combination:

Unique identifiers: Unique identifiers can be one or more sets of information that unambiguously identify a given sensor 106. Examples of unique identifiers can include, but are not limited to, serial numbers, stock keeping units (SKUs), inventory tag numbers, etc.

Certifications: Certifications can specify operating parameters of the sensor 106 and compliance of these operating parameters with one or more standards established by the manufacturer, national regulatory bodies (EN, FDA), and other standards setting organizations (e.g., ASTM, ISO, etc.). Compliance of a sensor with a given certificate can therefore allow use of the sensor 106 as permitted under the certificate. Example operating parameters for ultrasonic sensors can include, but are not limited to, frequency (e.g., peak, center, bandwidth), pulse length, signal to noise ratio, transmission dead zone, near field length, beam angle, output, etc. In certain embodiments, certificates stored by the RF tag can be updated with new information.

Datasheets: Datasheets can specify capabilities of the sensor 106. Example capabilities for ultrasonic sensors can include, but are not limited to, sensitivity (transmission and detection), resonant frequency (transmission and detection), selectivity (transmission and detection), directional angle, maximum input voltage, impedance, capacitance, pulse rise time, and temperature range.

Calibration due dates: Calibration due dates can designate when calibration of the sensor 106 should be performed according to established guidelines (e.g., by a sensor manufacturer, sensor owner, sensor operator, regulatory body, etc.).

Sensor setup: Sensor setup can include one or more predetermined values of operating parameters for the sensor 106. Operating parameters can specify the manner in which signals are generated and/or detected by the sensor 106. Example operating parameters for ultrasound sensors can include, but are not limited to, generated acoustic signal (e.g., sensitivity, pulses), distance over which reflected acoustic signals are detected (e.g., minimum or blanking distance, maximum distance), output control (e.g., measurement units, scaling), environmental variables (e.g., temperature compensation, multiplier, offset), and noise threshold. In certain embodiments, the sensor setup can include distance-gain-size (DGS) operating parameters for use in setting sensitivity of an ultrasonic sensor.

Sensor test orders: Test orders can be any information providing documentation that authorize use of the testing system 102 and can be provided by any of the external sources 112. Examples of test orders can include, but are not limited to, an identification of a structure to be tested, a scheduled test date, and measurements to be acquired by the sensor.

Operating time of the sensor: An operating time of the sensor 106 can be measured by the counter 214.

The sensor information can be transmitted to the RF tag 110 for storage in a variety of forms. As an example, one or more of the sensor specific information can be stored in its entirety by the RF tag 110. In another embodiment, one or more of the sensor specific information can be stored in a summarized form that occupies less memory storage than its entirety. As another example, one or more of the sensor information can be stored as a link (e.g., a hyperlink). The link can specify a network resource (e.g., a website, a database, etc.) from which the portable computing device 104 can retrieve the corresponding sensor information in its entirety and/or in summarized form. The network resource can be any of the external sources 112 discussed herein. This link can occupy less memory storage than either the entirety of the sensor information or the sensor information in summarized form. As another example, each of the sensor information can be stored as any combination of the above.

In certain embodiments, one or more of the sensor information can be provided to the RF tag 110 for storage prior to sale or use of the sensor 106 in the field. As an example, manufacturers can store unique identifiers, certificates, datasheets, and sensor setups on the RF tag 110 prior to sale of the sensor 106. As another example, owners or operators can store test orders and calibration due dates on the RF tag 110 prior to use of the sensor 106 in the field. As another example, an owner or operator of the sensor can employ the sensor interface 208 to store an operating time of the sensor 106 on the RF tag 110 during and/or after use of the sensor 106 in the field. As another example, sensor operators can employ the portable computing device 104 to update a sensor information stored by the RF tag before, during, or after use of the sensor 106 in the field.

Figure 6:
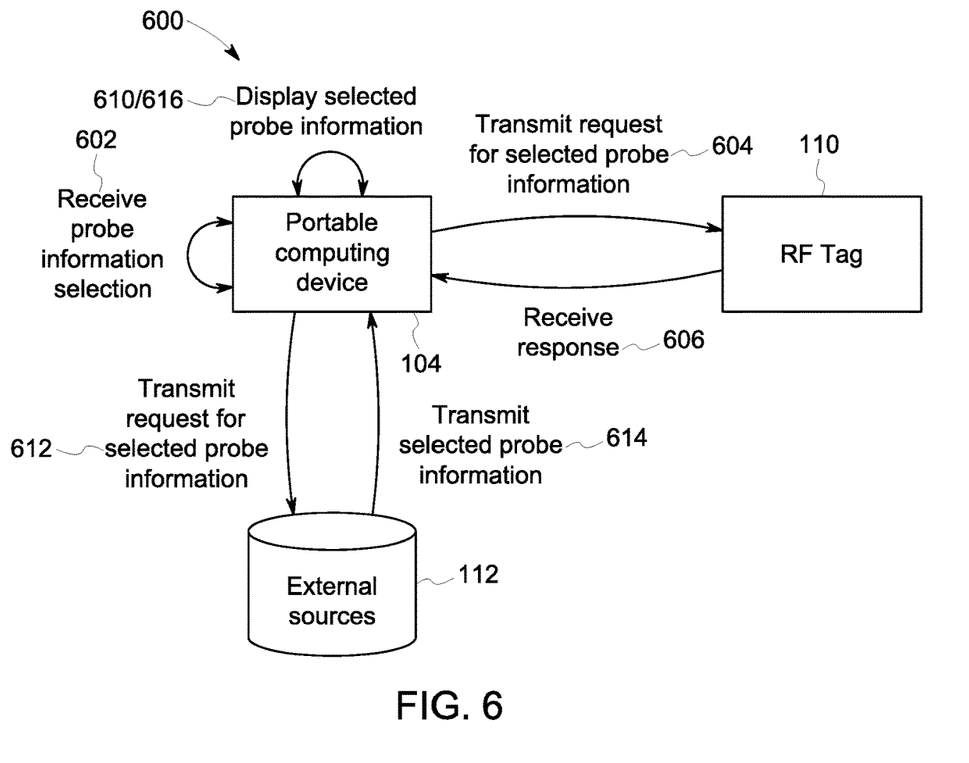
FIG. 6 is a diagram illustrating one exemplary embodiment of a method for using the components of the operating environment shown in FIG. 1.

FIG. 6 is a diagram illustrating one exemplary embodiment of a method 600 for communicating with the testing system 102 (e.g., the RF tag 110) for retrieval and storage of sensor information. In certain embodiments, the testing system 102 can include an ultrasonic probe as the sensor 106. However, the method is exemplary only and not limiting. The method can be altered, e.g., by having operations added, removed, or rearranged.

As shown in FIG. 6, the method 600 can include operations 602-616. In operation 602, the portable computing device 104 can receive a selection regarding sensor information to be retrieved from the RF tag 110. The portable computing device 104 can display a selectable list of sensor information options (e.g., user interface objects 406). Example options can include, but are not limited to, any of the sensor information discussed herein, alone or in combination with a form of the sensor information (e.g., a sensor information in its entirety, a sensor information summary, a sensor information link). The options can be based upon a default list or prior communication(s) with the RF tag 110 that establish its stored sensor information. Upon receipt of the selection by an operator of the testing system 102, the method 600 moves to operation 604. In an alternative embodiment, not shown, the portable computing device can select a default list of sensor information without operator input (e.g., all sensor information stored by the RF tag).

In certain embodiments, the RF tag 110 can store more than one document for a given type of sensor information. As an example, sensor setup information can be stored by the RF tag 110 in multiple documents, each of which can be suitable for use under different testing conditions (e.g., materials, testing environments, etc.). Under this circumstance, the portable computing device 104 can provide a selectable list of sensor information options (e.g., user interface objects 406) for each of the multiple documents stored by the RF tag 110.

In operation 604, the portable computing device 104 can transmit a first communication to the RF tag 110 requesting at least a portion of the sensor information stored by the RF tag 110. In an embodiment, the first communication can be a near field communication requesting sensor information corresponding to the option(s) selected by an operator in operation 602.

In operation 606, the portable computing device 104 can receive a second communication from the RF tag 110 in response to the first communication. The second communication can be a near field communication including one or more of the requested sensor information. As an example, the RF tag 110 can conduct a search of its memory and return any stored sensor information corresponding to the requested sensor information in the second communication.

In operation 610, any of the requested sensor information contained within the second communication can be displayed and/or optionally stored by the portable computing device 104.

In an embodiment, the second communication can include one or more of the sensor information in the form of a link. As discussed above, the link can be a hyperlink specifying a network resource (e.g., a website and/or database of external sources 112) and path storing one or more of the sensor information.

In operation 612, the portable computing device 104 can transmit a third communication to the network resource, via the network 114, requesting the sensor information corresponding to the link. As an example, an operator can select the link received in the second communication using the portable computing device 104. In another embodiment, the portable computing device 104 can detect the link within the second communication and automatically transmit the third communication to the network resource without operator intervention.

In operation 614, the portable computing device 104 can receive a fourth communication containing the sensor information requested in operation 612 from the network resource via the network 114.

In operation 616, any of the requested sensor information contained within the response from the network resource can be displayed and/or optionally stored, by the portable computing device 104. In an embodiment, if none of the requested sensor information is stored by the RF tag 110, the method can subsequently return to operation 602, allowing an operator to select sensor information to be retrieved from the RF tag 110. By default, if none of requested sensor information is stored by the RF tag 110, the second communication can include a link (e.g., a hyperlink) containing a unique identifier of the sensor 106. An operator can subsequently select the link using the portable computing device 104, to retrieve any sensor information associated with the sensor 106 from the network resource, as discussed above.

Figure 7:
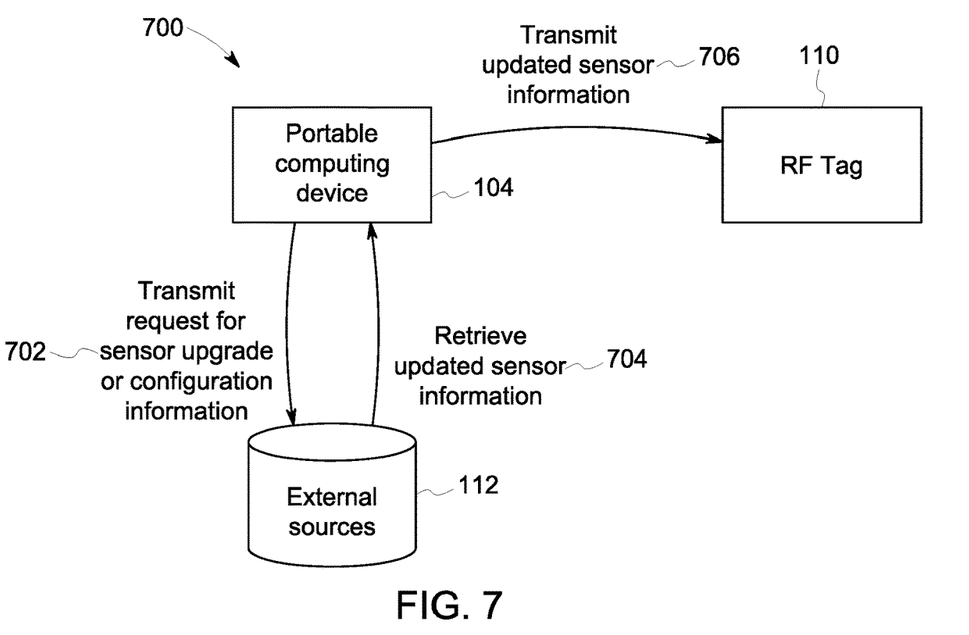
FIG. 7 is a diagram illustrating another exemplary embodiment of a method for using the components of the operating environment shown in FIG. 1.

FIG. 7 is a diagram illustrating another exemplary embodiment of a method 700 for updating sensor information, including operations 702-706. In an embodiment, the updated sensor information can be an updated certificate for the sensor 106. As an example, a given sensor 106 can be sold by a manufacturer in different versions, where each sensor version can have a different set of certifications and where a sensor of one version can be upgraded to another version by purchase of additional certificates. Accordingly, as discussed below, the method 700 can be employed to update the sensor certificate stored by the RF tag 110 with one or more new certificates.

In operation 702, the portable computing device 104 can send a request for updated sensor information to the network resource. As an example, transmission of the request can be performed in response to operator selections input using of the portable computing device 104. The request can include a unique identifier for the sensor 106, received by the portable computing device 104 prior to the transmission in operation 702. In certain embodiments, the portable computing device 104 can receive the unique identifier from the RF tag 110 according to the method 600, as discussed above.

In operation 704, a response to the request for updated sensor information can be received by the portable computing device 104 from the network resource. As an example, the response can contain one or more updated sensor information corresponding to the requested updated sensor information.

In operation 706, following receipt of the response, the portable computing device 104 can transmit the received updated sensor information to the RF tag 110 for storage.

Exemplary technical effects of the methods, systems, and devices described herein include, by way of non-limiting example, near field communication suitable for retrieval and storage of sensor information from testing devices including sensors such as ultrasonic probes.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing system (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and system of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. An ultrasound testing system, comprising:
    an ultrasound probe; and
    a radiofrequency (RF) tag configured to:
        store a unique identifier of the ultrasound probe the first probe information including a first ultrasonic probe certificate;
        wirelessly transmit the unique identifier and in response to receipt of a near-field communication from an authorized source, wherein the transmitted portion of the probe information includes a link to a network resource storing a second ultrasonic probe certificate; and
        receiving from the authorized source, the second ultrasonic probe certificate.

2. The ultrasound testing system of claim 1, wherein the RF tag is configured for passive operation.

3. The ultrasound testing system of claim 1, wherein the RF tag is mounted to a housing of the ultrasound probe.

4. The ultrasound testing system of claim 1, wherein the RF tag is configured to receive second probe information from the ultrasound probe for storage.

5. The ultrasound testing system of claim 4, wherein the second probe information includes an operating time of the ultrasound probe.

6. The ultrasound testing system of claim 1, wherein the near-field communication is received from a portable computing device.

7. The ultrasound testing system of claim 6, wherein the first probe information further includes at least one of an ultrasound probe datasheet, a calibration due date for the ultrasound probe, and/or test orders for the ultrasound probe.

8. A method for communicating with an ultrasound testing system, comprising:
    causing a portable computing device to transmit a first near-field communication to a radiofrequency (RF) tag that stores a unique identifier of an ultrasound probe and first probe information regarding the ultrasound probe, different from the unique identifier, the first probe information including a first ultrasonic probe certificate, wherein the first near-field communication requests the unique identifier stored by the RF tag,
    wherein the portable computing device receives a second near-field communication that includes the unique identifier and a link to a network resource storing a second ultrasonic probe certificate;
    receiving, by the portable computing device, the second ultrasonic probe certificate; and
    transmitting, via a third near-field communication, the second ultrasonic probe certificate.

9. The method of claim 8, wherein the first probe information includes further includes at least one of a ultrasound probe datasheet, a calibration due date for the ultrasound probe, test orders for the ultrasound probe, and/or an operating time of the ultrasound probe.

10. The method of claim 8, wherein the probe information includes an operating time of the ultrasound probe.

11. The method of claim 8, further comprising:
    causing the portable computing device to transmit a third communication to the network resource requesting the probe information corresponding to the link,
    wherein the portable computing device receives a fourth communication that includes the probe information corresponding to the link.

12. The method of claim 8, wherein the RF tag is mounted to the ultrasound probe.

* * * * *